United States Patent [19]
Baccman

[11] Patent Number: 5,536,463
[45] Date of Patent: Jul. 16, 1996

[54] SYSTEM AND METHOD FOR MOLDING PLASTIC WHEEL COVERS

[75] Inventor: Bjorn Baccman, Hendersonville, Tenn.

[73] Assignee: Del-Met Corporation, Hendersonville, Tenn.

[21] Appl. No.: 293,733

[22] Filed: Aug. 19, 1994

[51] Int. Cl.⁶ .................................................. B29C 33/30
[52] U.S. Cl. ............................ 264/219; 249/57; 249/102; 249/142; 249/156; 425/183; 425/190; 425/192 R
[58] Field of Search ..................................... 425/183, 190, 425/192 R; 249/102, 156, 57, 142, 160; 264/219; 206/223, 575

[56] References Cited

U.S. PATENT DOCUMENTS

| | | | |
|---|---|---|---|
| 3,480,329 | 11/1969 | Foster et al. | 301/37.1 |
| 3,724,803 | 4/1973 | Goldfarb | 425/183 |
| 3,871,611 | 3/1975 | Taketa | 249/102 |
| 3,876,257 | 4/1975 | Buerger | 301/37 P |
| 4,202,522 | 5/1980 | Hanas et al. | 249/102 |
| 4,384,702 | 5/1983 | Boskovic | 249/103 |
| 4,416,604 | 11/1983 | Bender et al. | 425/183 |
| 4,523,789 | 6/1985 | Schwarz | 301/37 P |
| 4,530,484 | 7/1985 | Baba | 425/129.1 |
| 4,783,041 | 11/1988 | Sakaida et al. | 249/103 |
| 4,822,109 | 4/1989 | Feria | 301/37 P |
| 4,979,720 | 12/1990 | Robinson | 249/103 |
| 4,998,780 | 3/1991 | Eshler et al. | 301/375 |
| 5,116,450 | 5/1992 | Spoo et al. | 156/441 |
| 5,262,116 | 11/1993 | Von Holdt, Sr. | 425/192 R |
| 5,282,733 | 2/1994 | Noritake et al. | 425/183 |

FOREIGN PATENT DOCUMENTS

| | | | |
|---|---|---|---|
| 59-59501 | 4/1984 | Japan | 249/160 |
| 59-142110 | 8/1984 | Japan | 249/142 |
| 61-211009 | 9/1986 | Japan | 249/102 |
| 63-5917 | 1/1988 | Japan | 249/142 |

OTHER PUBLICATIONS

D.M.E. Catalog, Copyright 1966, p. 264, Data Sheet No. 101.

*Primary Examiner*—Robert Davis
*Attorney, Agent, or Firm*—Natter & Natter

[57] ABSTRACT

A wheel cover mold assembly is provided for all wheel cover styles of a particular wheel diameter and mounting system. The mold assembly includes a top and a bottom base. The top base carries a mold cavity plate and the bottom base carries a mold core plate. The mold cavity plate and mold core plate include cavity surfaces defining the configuration of a specific wheel cover. The bottom mold base additionally includes a core retainer plate, inserts and/or cores which define, in cooperation with the mold core plate, mold cavity portions for a wheel cover mounting system common to various wheel cover styles. If the mounting system comprises an annular grip ring, for example, the inserts or cores cooperate with the core plate to form a grip ring receiving channel on the inner face of the wheel cover. If the mounting system includes individual mounting clips, the mold inserts configure the mold cavity for clip receiving sockets which project axially from the inner face of the wheel cover. For a wire band mounting system, cam face inserts are configured to define axial leg arrays which carry a wire band.

17 Claims, 4 Drawing Sheets

SYSTEM AND METHOD FOR MOLDING PLASTIC WHEEL COVERS

BACKGROUND OF THE INVENTION

1. Field of the Invention

This invention relates generally to the production of wheel trim and more particularly to a system and method for reducing costs and increasing production efficiency in the manufacture of diverse molded plastic wheel covers having a common mounting system.

2. Background History

Molded plastic wheel covers have gained widespread acceptance as both OEM equipment and as stable aftermarket lines. Among the acknowledged advantages of molded plastic wheel covers were corrosion resistance, light weight, the ability to be painted to match or compliment vehicle color and the ability to be plated to simulate metal wheels.

The versatility and durability of molded plastic wheel covers has been such that they have been virtually universally accepted as the standard alternative to cast metal wheels in OEM new vehicle applications and have additionally captured the bulk of the aftermarket.

A variety of mounting and retention systems have been utilized for plastic wheel covers including a metal grip ring seated in a channel, as disclosed in U.S. Pat. No. 3,876,257, issued to the assignee of the present invention, retention clips seated in hollow sockets, such as disclosed in U.S. Pat. No. 4,523,789 and grip fingers which were outwardly spring biased by a wire band, as illustrated in U.S. Pat. Nos. 4,822,109 and 3,480,329.

A further example of plastic wheel cover mounting systems was exemplified in U.S. Pat. No. 4,998,780 which disclosed lug nut caps, carried by a wheel cover, and threaded on exterially threaded portions of wheel lug nuts.

With automotive manufacturers constantly striving for consumer acceptance through first impression styling i.e., by presenting vehicles with attractive and unique appearance, there was a demand for OEM suppliers to have production capability for multiform wheel cover styles which were all mountable to the same size wheel and utilized the same mounting system. Unfortunately, each wheel style required a completely new mold assembly. As such, significant capital costs were attributable to each different wheel cover style.

Additionally, for each model year changeover, completely new wheel cover mold tooling was required and sufficient lead time was necessary to complete such tooling.

A significant proportion of mold tooling costs, in terms of mold design and fabrication labor, were attributable to the mounting system rather than the aesthetic styling of the wheel cover itself.

SUMMARY OF THE INVENTION

In compendium, the invention comprises a system for molding differently styled wheel covers, all of which employ a common mounting arrangement. A mold assembly is formed of a pair of mold bases. An upper mold base includes a clamp plate and a mold cavity plate. The mold cavity plate includes mold cavity surfaces serving to define the shape of the axially outer face of a wheel cover. A lower mold base includes a support plate, a core retainer plate and a mold core plate having mold cavity surfaces which define the inner face of the wheel cover.

Mounting system mold components which may comprise inserts, cam actuated cores or portions of the core retainer plate, include cavity surfaces which define wheel cover mounting system mold cavity segments common to various differently styled wheel covers.

In instances wherein the mounting system comprises an annular grip ring, mounting system mold components, in combination with the mold cavity surfaces of the core plate, form an annular collar having a channel for receiving a grip ring.

In instances wherein the mounting system comprises individual clips, mold inserts define clip receiving sockets on the inner face of the wheel cover. For wheel covers having a wire band mounting system, cam face inserts are employed to define the radially outer surfaces of axial legs which carry a wire band.

From the foregoing summary, it will be appreciated that it is an aspect of the present invention to provide a molding system and a method for manufacture of plastic wheel covers of the general character described which is not subject to the disadvantages of the background history aforementioned.

A feature of the present invention is to provide a molding system and method for manufacture of plastic wheel covers of the general character described with significantly reduced mold costs.

It is a consideration of the present invention to provide a molding system and method for manufacture of plastic wheel covers of the general character described which simplifies mold changeovers.

To provide a molding system and method for manufacture of plastic wheel covers of the general character described which simplifies the production of mold tooling for differently styled wheel covers is yet a further aspect of the present invention.

Another feature of the present invention is to provide a molding system and method for manufacture of plastic wheel covers of the general character described whereby uniformity of specified mounting systems employed by differently styled wheel covers will be assured.

A further consideration of the present invention is to provide a molding system and method for manufacture of plastic wheel covers of the general character described which is particularly well adapted for employment in enhanced mass production fabrication environments.

To provide a molding system and method for manufacture of molded plastic wheel covers of the general character described with reduced tooling costs is yet another aspect of the present invention.

A further consideration of the present invention is to provide a molding system and method for manufacture of molded plastic wheel covers of the general character described with rapid mold changeovers.

Other aspects, features and considerations of the present invention in part will be obvious and in part will be pointed out hereinafter.

With these ends in view, the invention finds embodiment in the various arrangements of parts, combinations of elements and series of steps by which the aforesaid and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings in which are shown some of the various possible exemplary embodiments of the invention.

DESCRIPTION OF THE PREFERRED EMBODIMENTS

Figure 1:
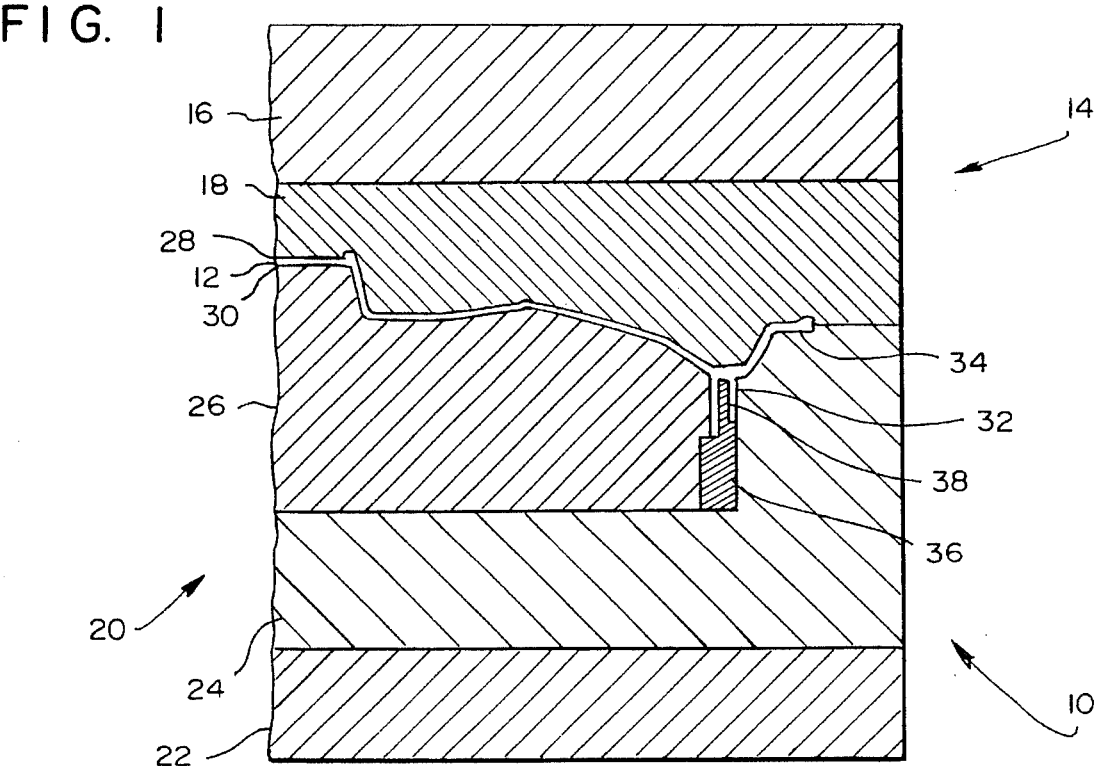
FIG. 1 is a fragmentary sectional view through a mold assembly configured for molding a plastic wheel cover having an annular channel for receiving a grip ring and showing a mold cavity plate, a mold core plate seated in a core retainer plate as well as mounting system mold components which define the shape of a grip ring receiving channel.

Referring now in detail to the drawings, the reference numeral 10 denotes generally a mold assembly constructed in accordance with and embodying the invention. The mold assembly 10 may comprise a mold base assembly fabricated of standardized components such as available from D.M.E. Corporation of Detroit, Mich. and generally known in the industry. As such, various commonly employed components which are not essential to an understanding of the invention, such as ejector pins, ejector retainer plates, ejector plates and ejector housings have been omitted to more clearly illustrate the invention. It should also be understood that although depicted in conjunction with a vertical mold assembly, the invention has equal applicability in horizontal or front-to-back mold assemblies.

The mold assembly 10 includes a mold cavity 12 configured for molding a plastic wheel cover having a mounting system substantially as disclosed in U.S. Pat. No. 3,876,257, incorporated herein by reference. Such wheel cover includes an annular channel formed in a collar which projects axially from its inner face. An annular grip ring is seated in the channel.

The mold assembly 10 includes an upper base 14, formed of a top clamping plate 16 and a mold cavity plate 18. The mold assembly 10 also includes a lower base 20, formed of a support plate 22, a core retainer plate 24 and a mold core plate 26. It should be appreciated that an ejector assembly (not shown) may be positioned beneath the support plate 22 as is conventional.

The mold cavity plate 18 includes mold cavity surfaces 28 which define portions of the mold cavity 12 for shaping the axially outer face of the wheel cover. Similarly, the mold core plate 26 includes mold cavity surfaces 30, which serve to configure the inner face of the wheel cover.

Pursuant to the invention, a segment of the core retainer plate 24 includes mounting system mold components comprising a cylindrical wall 32, which defines the mold cavity surface for the radially outer face of a collar in which a channel is formed and an adjacent surface 34 which defines the mold cavity surface for a peripheral lip on the inner face of the wheel cover.

An annular mold insert 36 is also seated against a lower portion of the wall 32. The mold insert 36 is configured with a reduced thickness cylindrical band 38 which defines mold cavity surfaces for the grip ring channel of the wheel cover.

It should also be noted that the mold core 26 is received in the core retainer plate 24 and includes a peripheral cylindrical wall 38 which defines the mold cavity surface for radially inner face of the collar.

In accordance with the invention, the top clamping plate 16, the core retainer plate 24, the insert 36 and the support plate 22 constitute multiple use common molding system components which are employed for molding differently styled wheel covers for the same size wheel. For example, illustrated in FIG. 2 is a mold assembly 10a for molding a wheel cover having a plurality of vent openings and with a different contour than the wheel cover molded with the mold cavity 12 of the mold assembly 10 illustrated in FIG. 1.

Figure 2:
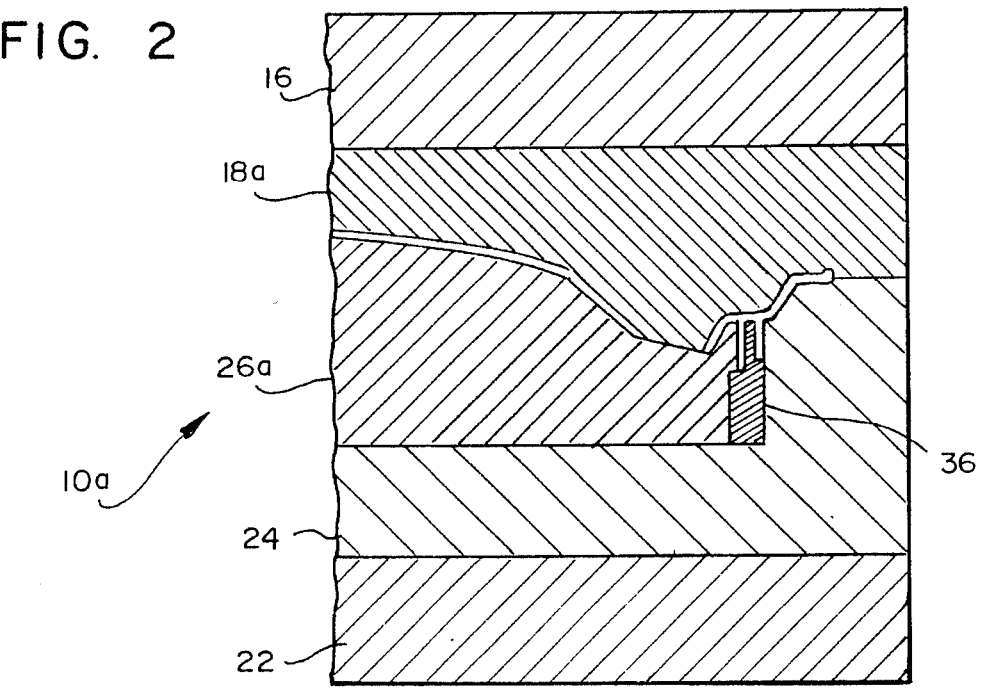
FIG. 2 is a fragmentary sectional view through a mold assembly configured for molding a differently styled wheel cover having the same retention system, and utilizing the same mounting system mold components employed in the mold assembly of FIG. 1.

The mold assembly 10a depicted in FIG. 2, utilizes the same top clamping plate 16, core retainer plate 24, mold insert 36 and mold support 22 as the mold assembly depicted in FIG. 1. Only the mold components which define the aesthetic configuration of the wheel cover, i.e. a mold cavity plate 18a and a mold core plate 26a have been changed.

Figure 3:
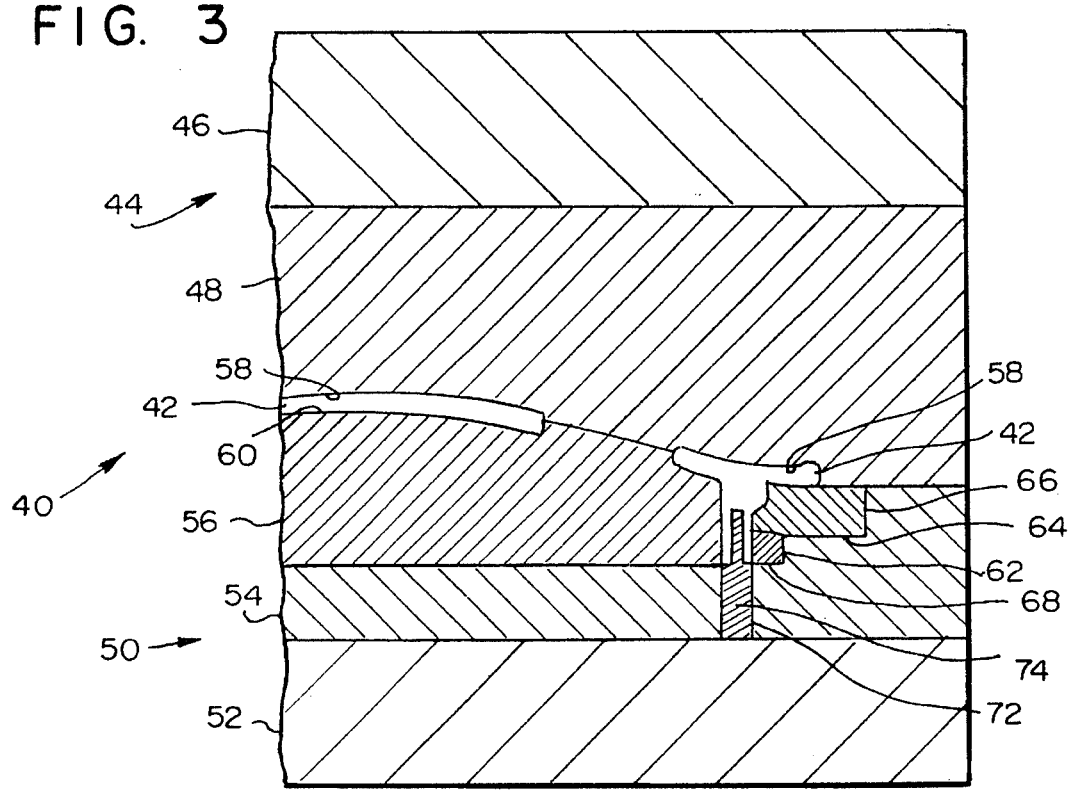
FIG. 3 is a fragmentary sectional view through a mold assembly configured for molding a plastic wheel cover having a mounting system utilizing retention clips seated in hollow sockets and showing mold inserts configured for molding the retention clip sockets.

In FIG. 3 there is depicted a mold assembly 40 configured for molding a plastic wheel cover having a mounting system comprising a plurality of clips seated in sockets formed on the inner face of a wheel cover. A typical example of such mounting system is disclosed in U.S. Pat. No. 4,523,789, incorporated herein by reference.

The mold assembly 40 is configured with a mold cavity 42 defining the desired wheel cover shape and includes an upper base 44, formed of a top clamping plate 46 and a mold cavity plate 48. The mold assembly 40 also includes a lower base 50 formed of a support plate 52, a core retainer plate 54 and a mold core plate 56. As will be noted from an examination of FIG. 4 comprising a sectional view taken through an alternate radial plane wherein the molded wheel cover will not include a retention socket, the core retainer plate 54 is formed substantially of one piece construction.

The mold cavity plate 48 includes mold cavity surfaces 58 which define portions of the mold cavity 42 for shaping the axially outer face of the wheel cover. Similarly, the mold core plate 56 includes mold cavity surfaces 60 which serve to configure the inner face of the wheel cover.

Pursuant to the invention, the core retainer plate 54 includes a central recessed well having a generally flat planar circular central area defined by an annular shoulder 62. From the top of the shoulder 62, the core retainer plate extends radially outwardly along a planar surface 64, the outer circumference of which is defined by an annular wall 66.

Figure 4:
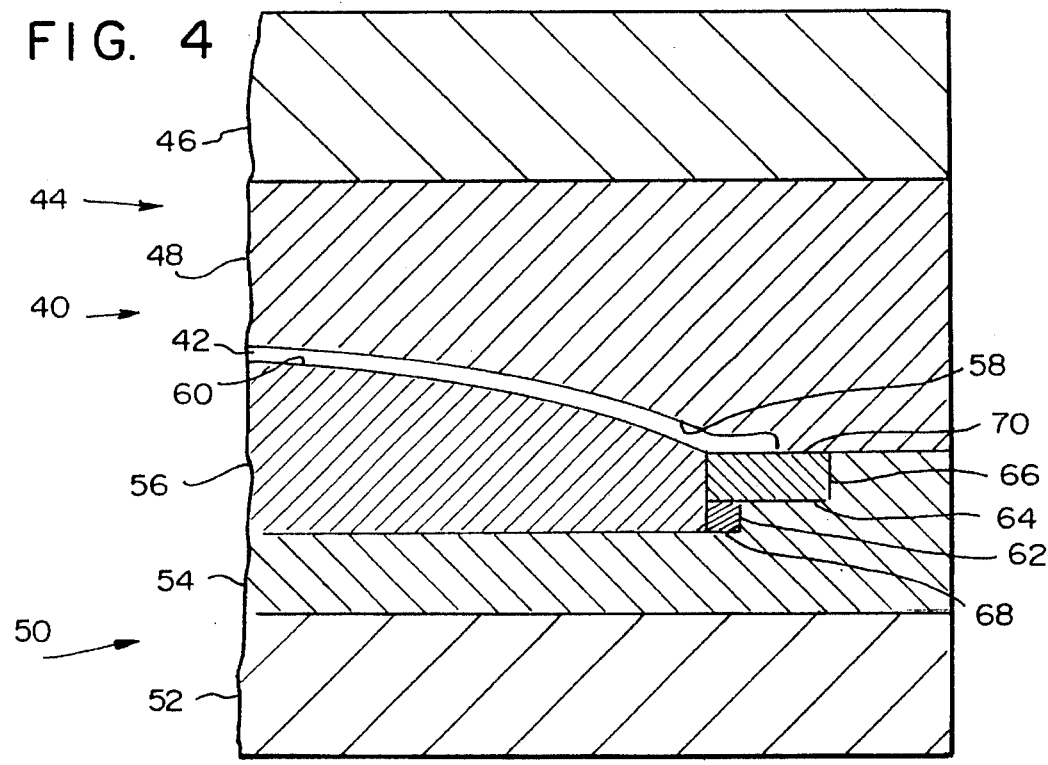
FIG. 4 is a further fragmentary sectional view through the mold assembly of FIG. 3 and showing a portion of the mold which does not include the sockets.

A first spacer insert ring 68 of substantially rectangular cross section is seated against the shoulder 62 and its radially inner surface defines a shoulder against which the mold core plate 56 is seated as depicted in FIG. 4. A second insert ring 70 is seated on top of the first insert ring 68 and on the planar surface 64 and is positioned between the mold core plate 56 and the planar wall 66.

As will be seen from an examination of FIG. 4, in areas of the wheel cover wherein no retention clip sockets are provided, the mold core surface 60 of the mold core plate 56 is continuous with the upper surface of the second insert ring 70 to provide a smooth inner face for the wheel cover. In equidistantly spaced areas around a circle, the core retainer plate 54 includes a hollow seat or well 72. Within each well 72, a mold insert 74 is seated. The mold inserts 74 include a substantially rectangular upwardly projecting tongue which serves to define the mold cavity surfaces for a seat area of a socket for receiving a wheel retention clip. Mold cavity surfaces for the radially inner wall of each socket, as well as the sides of each socket are formed by cut away portions of the core retainer plate 54, while mold cavity surfaces for the outer wall of each socket which includes a wheel cover centering rib which projects radially outwardly from each socket, is formed by a cut away portion of the second insert ring 70.

To produce a differently styled wheel cover having the same retention system utilizing the mold assembly 40, one need only substitute a new mold cavity plate and a new mold core plate which have mold cavity surfaces configured for the differently styled wheel cover.

Figure 5:
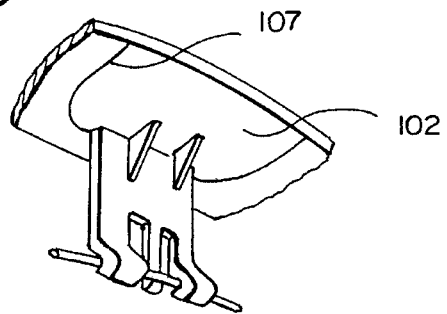
FIG. 5 is a fragmentary enlarged perspective illustration of a peripheral portion of the inner face of a plastic wheel cover having a wire band grip finger mounting system.
Figure 6:
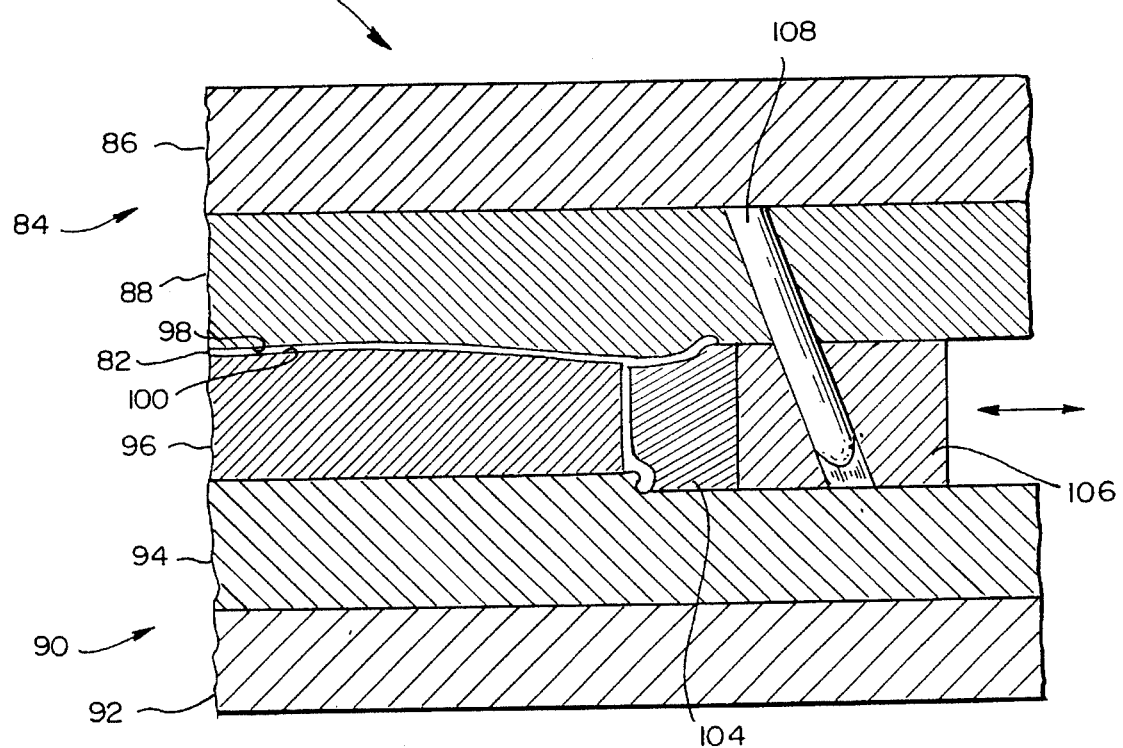
FIG. 6 is a sectional view through a mold assembly for molding the wheel cover depicted in FIG. 5 and showing a portion of a cam face insert configured for molding a leg portion.

With attention now directed to FIG. 5, wherein a fragmentary portion of a wheel cover having a spring wire band retention system is disclosed, it should be noted that the retention system disclosed therein includes a pair of spaced mounting legs having a radially outwardly projecting boss designed to engage the draw bead step in a wheel rim, with the legs being outwardly biased by the wire band. A central leg bears against the wire band and serves to maintain the band in position seated in a groove on the inner face of the mounting legs.

Wheel covers having retention systems of this general configuration are disclosed in U.S. Pat. Nos. 4,822,102 and 3,480,329, both of which are incorporated herein by reference.

A mold assembly 80 is configured to mold a plastic wheel cover in the shape of a mold cavity 82 having the retention system depicted in FIG. 5 and includes an upper base 84 formed of a top clamping plate 86 and a mold cavity plate 88. The mold assembly 80 also includes a lower base 90 formed of a support plate 92, a core retainer plate 94 and a mold core plate 96. As with the mold assemblies 10 and 40, a conventional ejector assembly (not shown) may be positioned beneath the mold support plate with ejector pins extending through the support plate, the core retainer plate and the mold core plate.

The mold cavity plate 88 includes mold cavity surfaces 98 which define portions of the mold cavity for shaping the outer face of the wheel cover. Similarly, the mold core plate 96 includes mold cavity surfaces 100 which serve to configure the inner face of the wheel cover.

Pursuant to the invention, the core retainer plate 94 includes an annular planar surface against which the mold core plate is seated. In equidistantly spaced selected areas along the periphery of the planar seat surface, the core retainer plate extends about a curved surface downwardly to define a mold cavity surface for the groove on the inner face of the mounting leg. Mold cavity surfaces for the radially outer surface of the mounting legs, as well as a registered corresponding zone 102 on the inner face of the wheel cover, are defined by surfaces of a core insert 104 which is secured to a cam block 106. The juncture of the mold core insert inner wheel cover face mold cavity surface and the surrounding mold cavity surface of the mold core plate 96 appears as a line 107 on the inner wheel cover face.

The cam block 106 moves in a radially outward direction when the upper base 84 is separated from the lower base 90 as a result of engagement between a cam 108, secured in the cavity plate 88 and a mating cam surface of the cam block 106. Such cam structures are well known to those familiar with conventional molding techniques. Tables of active cam distances for pulling cores are readily available from sources such as D.M.E. Corporation of Detroit, Mich., e.g. D.M.E. Catalog, copyright 1966, p 264, Data Sheet No. 101 incorporated herein by reference.

In accordance with the invention, in instances wherein a different configuration plastic wheel cover is to be molded with the same retention system, only the cavity plate 88 and the core plate 96 need be modified to provide mold cavity surfaces defining the new wheel cover configuration.

Figure 7:
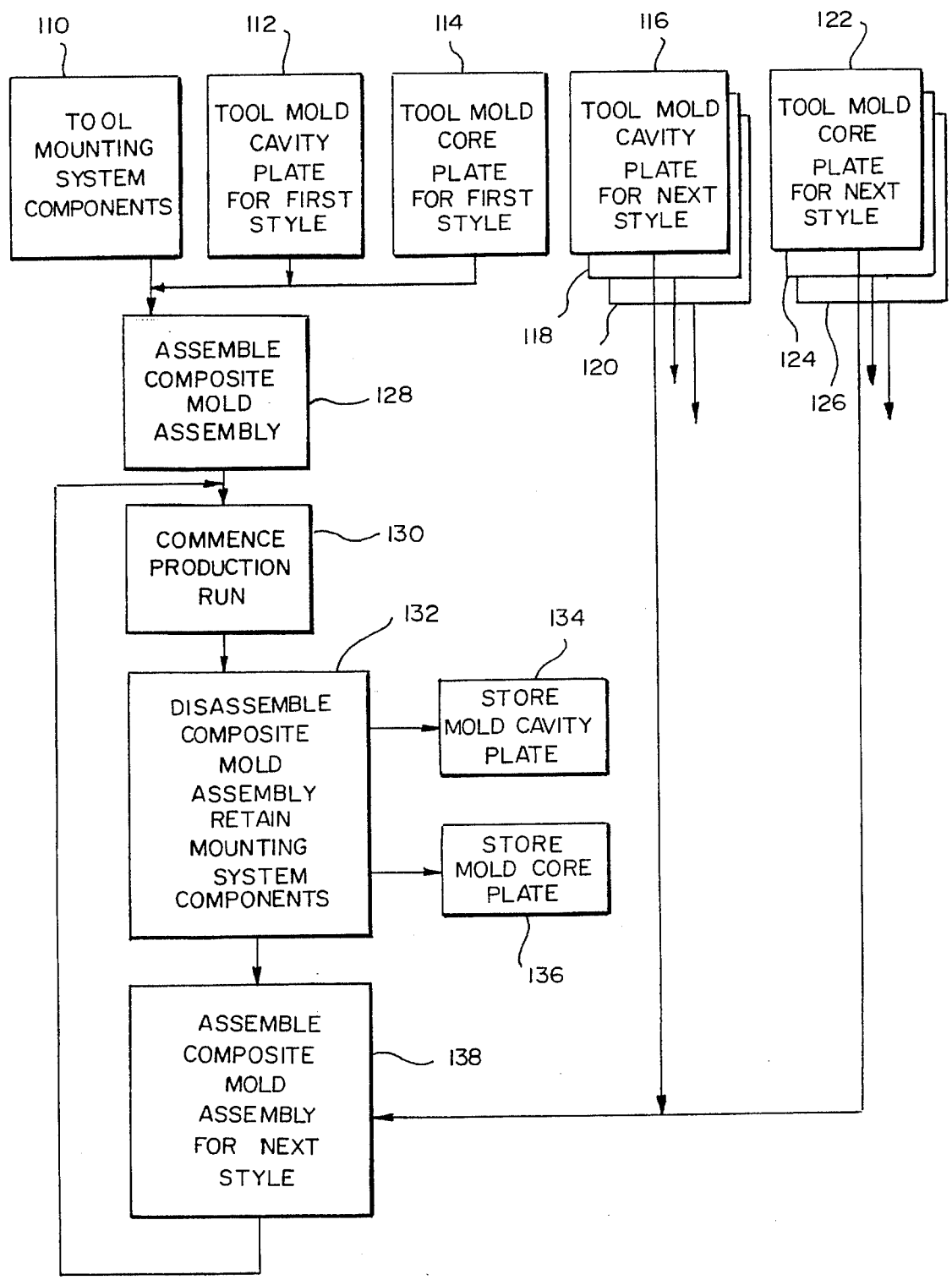
FIG. 7 comprises a flow chart showing the method of the present invention whereby mold assemblies for differently styled wheel covers having a common mounting system may be efficiently fabricated at reduced cost.

With reference now to FIG. 7 wherein a flow chart depicting the various steps in the method of the present invention is illustrated, it will be seen that in accordance with the molding system, a mold assembly for a wheel cover having a specified mounting system is assembled by tooling the mounting system components common to all differently styled wheel covers having the same mounting system and wheel size as depicted in a block 110. Additionally, the mold cavity plate for the first style wheel cover is tooled as depicted in a block 112 and the mating mold core plate for the first styled wheel cover is tooled as depicted in a block 114. The tooling steps depicted in the blocks 110, 112 and 114 may take place simultaneously or sequentially.

When the styling configuration of additional wheel covers is known, the steps of tooling the mold cavity for the next and subsequent styled wheel covers proceeds as indicated in a series of blocks 116, 118 and 120. The steps of tooling the mating mold core plates for the next styled wheel covers as depicted in blocks 122, 124 and 126 also proceeds. The steps of tooling for subsequent styled wheel covers as depicted in blocks 116 through 126 may take place at any time.

After the tooling has been completed for the mounting system components and for the mold cavity plate and mold core plate for the first styled wheel cover, the step of assembling the composite mold assembly, as indicated in a block 128, takes place. Thereafter, a production run is commenced as indicated in a block 130. After completion of the production run, the method proceeds to the step of disassembling the composite mold assembly while retaining the common mounting system components. After disassembly, as indicated in a block 132, the mold cavity plate and the mold core plate are stored as indicated in a pair of blocks 134 and 136, respectively.

When it is appropriate to commence production of the next styled wheel cover having the same mounting system, the appropriate mold cavity plate and mold core plate which were tooled in the steps 116 and 122, for example, are utilized to assemble the composite mold assembly for the next styled wheel cover, utilizing the retained mounting system components, as indicated in a block 138. Thereafter, the method returns to the commencement of a production run as indicated in the block 130. After the production run has been completed, the method proceeds through the steps indicated in the blocks 132, 134 and 136 and returns to the block 138, however utilizing the appropriately styled mold cavity plates and mold core plates tooled in the steps 118 and 124, respectively.

Additional mold cavity plates and mold core plates for further differently styled wheel covers such as those tooled in the steps 120 and 126 and any further mold cavity and mold core tooling steps may be utilized to assemble composite mold assemblies as may be required for further differently styled wheel covers or, should the occasion arise for subsequent production runs of previously molded wheel cover styles, any previously used mold cavity plate and mold core plate sets stored in the steps indicated in the blocks 134 and 136 may be reemployed.

Thus it will be seen that there is provided a system and method for molding plastic wheel covers which achieves the various aspects, features and considerations of the present invention and which is well adapted to meet the conditions of practical usage.

As various changes might be made in the illustrative embodiments herein disclosed without departing from the spirit of the invention, it is to be understood that all matter herein described or shown in the accompanying drawings is to be interpreted as illustrative and not in a limiting sense.

Having thus described the invention, there is claimed as new and desired to be secured by Letters Patent:

1. A mold assembly for molding a plurality of differently styled plastic wheel covers each having an outer face, an inner face and a common mounting system, the assembly comprising a replaceable mold cavity plate and a replaceable mold core plate, the replaceable mold cavity plate including mold surfaces for defining the outer face of one of the plurality of styled plastic wheel covers, the replaceable mold core plate including mold surfaces for defining only portions of the inner face of the one styled plastic wheel cover, the mold assembly further including means for providing common mold surfaces which define at least a portion of the wheel cover mounting system universal to the plurality of differently styled wheel covers, the means for providing common mold surfaces including means which define a portion of the inner face of the wheel cover.

2. A mold assembly for molding a plurality of differently styled plastic wheel covers having a common mounting system as constructed in accordance with claim 1 wherein the means for providing common mold surfaces which define at least a portion of the wheel cover mounting system includes means engaging the replaceable mold core plate.

3. A mold assembly for molding a plurality of differently styled wheel covers having a common mounting system as constructed in accordance with claim 1 wherein the mold assembly further includes a retainer plate, the retainer plate receiving and retaining the mold core plate.

4. A mold assembly for molding a plurality of differently styled wheel covers having a common mounting system as constructed in accordance with claim 3 wherein the means for providing common mold surfaces comprises a portion of the retainer plate.

5. A mold assembly for molding a plurality of differently styled wheel covers having a common mounting system as constructed in accordance with claim 1 wherein the replaceable mold core plate includes mold surfaces for defining a portion of the wheel cover mounting system.

6. A mold assembly for molding a plurality of differently styled wheel covers having a common mounting system as constructed in accordance with claim 1 wherein the means for providing common mold surfaces which define at least a portion of the wheel cover mounting system includes at least one mold insert.

7. A mold assembly for molding a plurality of differently styled wheel covers having a common mounting system as constructed in accordance with claim 6 wherein the means for providing common mold surfaces which define at least a portion of the wheel cover mounting system includes a plurality of inserts.

8. A mold assembly for molding a plurality of differently styled wheel covers having a common mounting system as constructed in accordance with claim 6 wherein said at least one insert comprises a mold core insert, the means for providing common mold surfaces which define at least a portion of the wheel cover mounting system further comprising a cam block and means securing the mold core insert to the cam block.

9. A mold assembly for molding a plurality of differently styled wheel covers having a common mounting system as constructed in accordance with claim 3 wherein the mold assembly further includes a clamping plate, the clamping plate abutting the replaceable mold cavity plate, the retainer plate abutting the replaceable mold core plate, the mold assembly further including a support plate, the support plate abutting the retainer plate.

10. A mold assembly for molding a plurality of differently styled wheel covers having a common mounting system as constructed in accordance with claim 3 wherein the means for providing common mold surfaces which define at least portions of the common wheel cover mounting system includes at least one insert, said at least one insert being carried in the retainer plate.

11. A mold assembly for molding a plurality of differently styled wheel covers having a common mounting system as constructed in accordance with claim 10 wherein the means for providing common mold surfaces which define at least a portion of the common wheel cover mounting system comprises a plurality of inserts, the plurality of inserts being carried in the retainer plate.

12. A mold assembly for molding a plurality of differently styled wheel covers having a common mounting system as constructed in accordance with claim 3 wherein the mounting system comprises a collar having a channel and the retainer plate includes common mold surfaces for defining a wall of the collar.

13. A mold assembly as constructed in accordance with claim 1, further including a plurality of replaceable mold cavity plates and a plurality of corresponding replaceable mold core plates, each replaceable mold cavity plate and each corresponding replaceable mold core plate including mold surfaces for defining a differently styled plastic wheel cover of the plurality, each replaceable mold cavity plate and each corresponding replaceable mold core plate being interchangeably received in the mold assembly.

14. A method of molding a plurality of differently styled plastic wheel covers which include a common mounting system, the method comprising the steps of:

(a) tooling mounting system components for a mold assembly, the mounting system components including common mold surfaces which define at least portions of the wheel cover mounting system;

(b) tooling a first cavity and core plate set comprising a replaceable mold cavity plate and a corresponding replaceable mold core plate, the replaceable mold cavity plate and the replaceable mold core plate including mold surfaces for defining at least a portion of an outer face and an inner face respectively of a first styled molded plastic wheel cover;

(c) tooling a second cavity and core plate set comprising a replaceable mold cavity plate and a corresponding replaceable mold core plate, the further set having mating mold surfaces for defining at least portions of an outer face and an inner face, respectively of a second differently styled plastic wheel cover;

(d) assembling a composite mold utilizing the tooled mounting system components and the first cavity and core plate set;

(e) molding a desired number of first styled plastic wheel covers with the composite mold;

(f) disassembling the composite mold after the desired number of wheel covers have been molded;

(g) retaining the mounting system components;

(h) assembling a composite mold with the mounting system components and the second cavity and core plate set for a second differently styled wheel cover; and (i) molding a desired number of second differently styled wheel covers.

15. A method of molding a plurality of differently styled wheel covers in accordance with claim 14 wherein more than two cavity and core plate sets are tooled.

16. A method of molding a plurality of differently styled wheel covers in accordance with claim 14 wherein step (c) takes place subsequent to step (d) and prior to step (h).

17. A method of molding a plurality of differently styled plastic wheel covers which include a common mounting system, the method comprising the steps of:

(a) providing a plurality of cavity and core plate sets, each set comprising a replaceable mold cavity plate and a corresponding replaceable mold core plate, the replaceable mold cavity plate and the replaceable mold core plate including mold surfaces for defining at least a portion of an outer face and an inner face respectively of a differently styled molded plastic wheel cover;

(b) providing mounting system components for the mold assembly, the mounting system components including common mold surfaces which define at least portions of the wheel cover mounting system;

(c) assembling a composite mold utilizing the mounting system components and a first cavity and core plate set;

(d) molding a desired number of first styled plastic wheel covers with the composite mold;

(e) disassembling the composite mold after the desired number of wheel covers have been molded;

(f) retaining the mounting system components;

(g) assembling a composite mold with the mounting system components and a second cavity and core plate set for a second differently styled wheel cover; and (h) molding a desired number of second differently styled wheel covers.

* * * * *